Patented Mar. 30, 1954

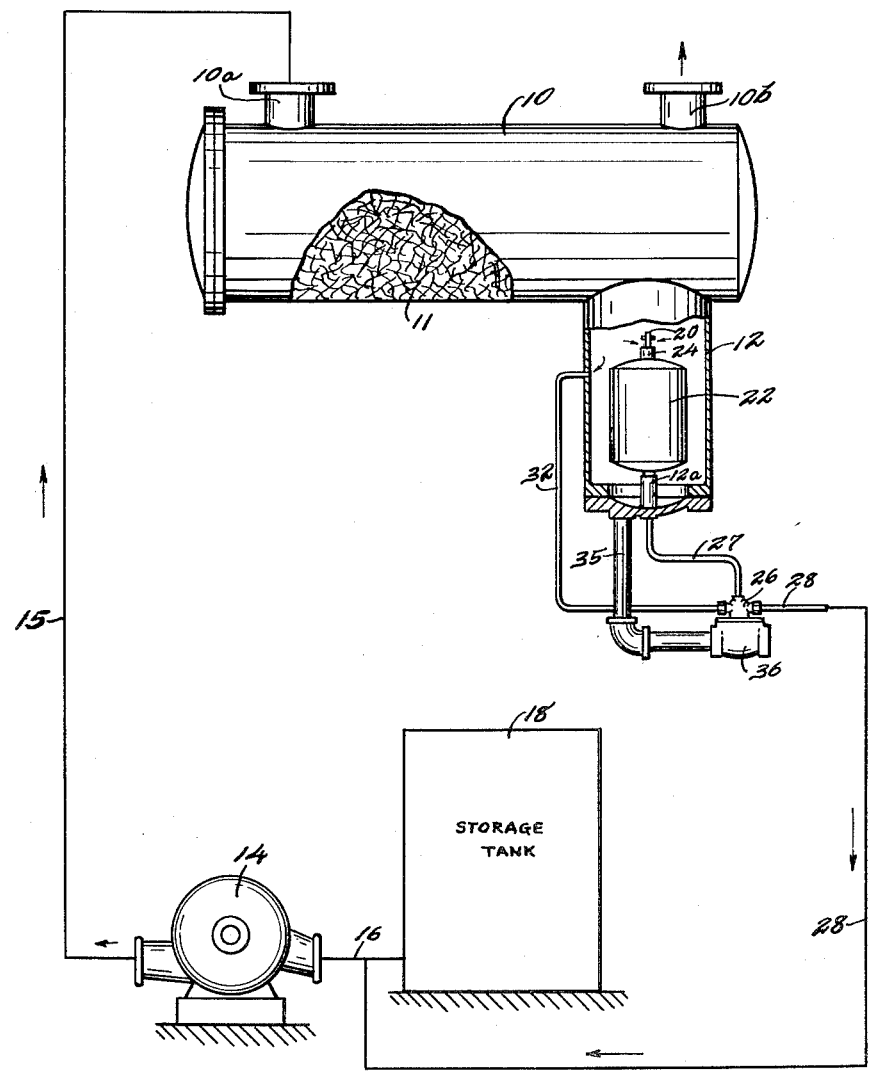

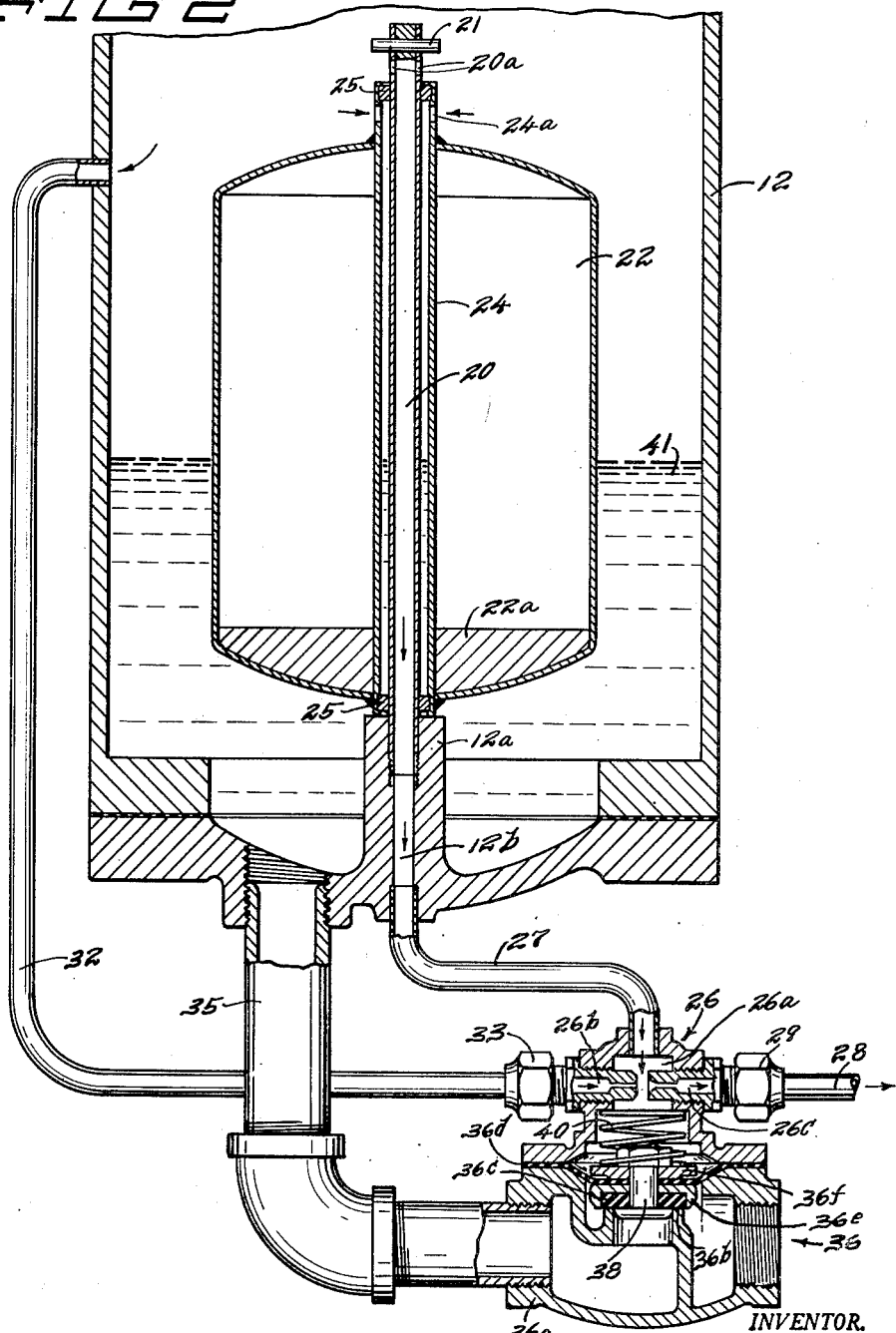

2,673,648

UNITED STATES PATENT OFFICE 2,673,648

SEPARATOR DRAIN VALVE STRUCTURE

Robert W. Kenney, South Pasadena, Calif., assignor to Stanley G. Harwood, South Pasadena, Calif.

Application March 24, 1952, Serial No. 278,274

6 Claims. (Cl. 210—43)

This invention relates to a separator and particularly to a separator adapted to separate water from a hydro-carbon liquid, such as gasoline. Such a separator commonly comprises a container or tank having inlet and outlet passages, a body of fibrous absorbent material in said container or tank which absorbs water from said liquid, the water draining from said fibrous material.

It is an object of this invention to provide a separator as above described in combination with a second container communicating with the bottom of said first mentioned container or tank and forming a sump, a float in said second container, a drain conduit leading from said second container and float controlled means for controlling the flow of water through said drain conduit.

It is a further object of the invention to provide such a structure as set forth in the preceding paragraph, together with an ejector having a chamber therein, a pump for pumping the hydro-carbon liquid into said first mentioned container or tank, a conduit connected to the inlet of said pump and connected to said chamber, a second conduit leading from above the bottom of said second container and communicating with said chamber, said second conduit having openings communicating with said second container and controlled by said float for varying the pressure in said chamber, and means controlled by the pressure in said chamber for controlling the flow of water through said drain conduit.

It is more specifically an object of this invention to provide in a separator for separating water from a hydro-carbon liquid comprising a container having inlet and outlet passages, said container having a body of absorbent fibrous material therein, a structure, having in combination, a second container communicating with the bottom of said container and arranged to have water from said first mentioned container drained thereinto, a conduit extending vertically in said second container and having one or more openings therein well above the bottom of said second container, a float in said second container movable by the water therein and adapted to close or open said openings, a pump for supplying hydro-carbon liquid to said inlet passage, an ejector having a chamber therein, a primary passage and a secondary passage, said conduit being connected to said chamber, a second conduit connected to the inlet side of said pump and being connected to said secondary passage, a third conduit connected to said primary passage and to said second container well above the bottom thereof, a drain conduit leading from the bottom of said second container and a valve for controlling the flow of liquid through said drain conduit operated by pressure of liquid in said chamber.

These and other objects and advantages of the invention will be fully set forth in the following description made in connection with the accompanying drawings in which like reference characters refer to similar parts throughout the several views and in which:

Fig. 1 is a somewhat diagrammatic view of the structure of this invention, some parts being broken away and others shown in vertical section; and Fig. 2 is a view partly in vertical section and partly in side elevation of a portion of the structure shown in Fig. 1 and shown on an enlarged scale.

Referring to the drawings, a tank or container 10 is shown and while this could take various forms, in the embodiment of the invention illustrated it is shown as an elongated cylindrical tank. Said tank has an inlet passage extending through a flanged conduit 10a communicating with said container and it has an outlet passage extending through another flanged conduit 10b. Said conduits 10a and 10b are shown as being spaced and disposed respectively adjacent the ends of container 10. Said conduits are preferably at the upper side of said container. Container 10 will have therein a body of absorbent fibrous material 11, such as the well known product excelsior. A second container 12 communicates with the bottom of container 10 and is shown as extending downwardly from one end thereof. Container 12 is also shown as cylindrical. A pump 14 is shown which will be driven by any suitable means and the same will supply hydrocarbon liquid, such as gasoline, to container 10 through a conduit represented by line 15. The gasoline will be discharged from container 10 through the outlet passage in conduit 10b. While various types of pumps could be used, in the embodiment of the invention illustrated, pump 14 is shown as a rotary pump and the same will be driven by any suitable motor. A conduit indicated by line 16 connects the inlet side of pump 14 to a storage tank 18 from which the liquid is pumped.

A conduit 20 extends vertically in container 12, the same being illustrated as being substantially coaxial with container 12. Conduit 20 is shown as threaded into a boss 12a which upstands from the bottom of container 12. Conduit 20 is closed at its upper end and a pin 21 extends transversely therethrough and projects at either side thereof. Conduit 20 has one or more circumferentially spaced holes 20a therein adjacent its top. It will be seen that these holes afford communication between container 12 and conduit 20. A float 22 is provided and while this might take various forms, in the embodiment of the invention illustrated it is shown as a cylindrical closed vessel or tank having rounded upper and lower ends and having a substantially semi-spherical member 22a in its bottom. A tube 24 is disposed axially in float 22, the same extending through the upper and lower ends thereof and being welded thereto. This tube 24 is closed at its upper and lower ends by the bearings 25. Tube 24 has two or more circumferentially spaced openings 24a above the top of float 22 which afford communication between tube 24 and container 12. A casing is provided comprising an ejector 26 and a valve body 36 hereinafter to be described. Said ejector 26 is provided having a chamber 26a therein. A conduit 27 is secured in the lower end of container 12 and communicates with chamber 26a. The boss 12a is bored between conduits 20 and 27 so that said bore 12b and conduits 20 and 27 can be considered as one conduit. The ejector 26 also comprises a primary passage 26b extending through a nozzle and being directed into chamber 26a. A secondary passage 26c extends through a nozzle and leads from chamber 26a. Passage 26c has a flaring inner end. Passage 26c communicates with a conduit 28 which is connected by a suitable coupling 29 with ejector 26. Conduit 28 is indicated in Fig. 1 and it communicates with the inlet side of pump 14. Another conduit 32 communicates with primary passage 26b and is suitably connected to ejector 26 by a coupling 33. Conduit 32 is secured to and communicates with the container 12 well above the bottom thereof.

A drain conduit 35 is secured to the bottom of container 12 and is connected to a valve body 36a of said valve 36. Valve 36 has a valve seat 36b which engages a valve plate 36c which permits or prevents the passage of water through valve 36 and from conduit 35. Valve body 36a is connected to a bottom flange on ejector 26 and a diaphragm 36d is disposed between said flange and valve body 36a. Members 36e and 36f are disposed at opposite sides of diaphragm 36d and clamped thereto by a headed rivet 38. The valve plate 36c will preferably be made of rubber or rubber-like material and diaphragm 36d will be made of some strong flexible material. A compression coiled spring 40 engages a portion of ejector 26 at its upper end and at its lower end engages the top of plate 36f. Spring 40 therefore tends to move diaphragm 36d downwardly and to hold plate 36c against seat 36b to close valve 36.

In operation, the hydro-carbon liquid, such as gasoline, will be pumped into container 10 and will flow out through conduit 10b. The body of material 11 will absorb any water contained in the hydro-carbon liquid and this water will drain from said material and flow into the container or sump 12. The float 22 in Fig 2 is shown in its lower position so that there is not enough water 41 in container 12 to lift float 22. Hydro-carbon liquid is being pumped into the container 10 and hydro-carbon liquid is also being drawn from container 10 through conduit 32, through the primary passage 26b of the ejector 26 and through conduit 28 to the pump. Hydro-carbon liquid is also flowing through the openings 20a and through the conduit comprising tubes 20 and 27 and bore 12b into chamber 26a of the ejector. The flow of hydro-carbon liquid into chamber 26a from conduits 27 and 32 is too great for the ejector secondary passage 26c to handle or take care of and this produces a flooded condition which builds up pressure in chamber 26a. This pressure together with that of spring 40 forces diaphragm 36d and valve plate 36c downwardly so that the latter engages seat 36b and valve 36 is held in closed position. When sufficient water has drained into container or sump 12, float 22 will be raised by this water and the bearing 25 will move over the holes 20a and close the same. Flow of hydro-carbon liquid into chamber 26a through the conduit 27 is now shut off and said chamber is no longer flooded. When said flow of liquid through conduit 27, causing the flooded condition, is stopped, then secondary passage 26c is is able to handle the liquid flowing into chamber 26a causing a reduced pressure in said chamber. The resulting pressure of the water in container 12 and conduit 35 acts to lift valve plate 36c and diaphragm 36d so that valve 36 is now opened and water can pass therethrough. When a certain amount of water has thus drained through conduit 35 and valve 36, float 22 will again descend and upper bearing 25 will be moved below openings 20a and hydro-carbon liquid will again flow through conduit 27 into chamber 26a. This will build up pressure in chamber 26a, as described, and diaphragm 36d and valve plate 36c will again be forced downwardly and the flow of water through drain conduit 35 will be prevented. The discharged water will be conducted through a suitable conduit from valve 36 to the desired place.

From the above description it will be seen that I have provided a very simple and hydraulically actuated automatic means for periodically discharging the water from container 12. The separator and the flow of hydro-carbon liquid therethrough can thus be continuous. No attention of an operator is necessary to discharge the water when this is desirable. The device is quite simple and the parts are all quite rugged so that no operating difficulties will be encountered. The device has been amply demonstrated in actual practice and found to be very successful and efficient.

It will of course be understood that various changes may be made in the form, details, arrangement and proportions of the parts, without departing from the scope of applicant's invention, which generally stated, consists in a device capable of carrying out the objects above set forth, in the parts and combinations of parts disclosed and defined in the appended claims.

What is claimed is:

1. A separator drain valve structure comprising a container having inlet and outlet passages and a body of fibrous absorbent material disposed in said container, in combination with a second container communicating with the lower side of said container, a float in said second container, a conduit leading into said second container from the bottom thereof and having openings thereinto disposed quite a distance above the bottom of said second container, said openings communicating with said second container, said float being movable on said conduit and controlling said openings, a pump for forcing a hydrocarbon liquid into said inlet passage, a second conduit communicating with the inlet side of said pump, an ejector having a chamber, a primary passage communicating with said chamber and a secondary passage leading from said chamber, said first mentioned conduit being connected to said chamber, a third conduit communicating with said second container above the bottom thereof and communicating with said primary passage, said second conduit communicating with said secondary passage, a drain conduit leading from said second container, and a valve for controlling said drain conduit operated by pressure in said chamber.

2. In a separator for separating water from a hydro-carbon liquid comprising a container having inlet and outlet passages, a body of fibrous absorbent material in said container, a drain valve structure having in combination, a second container communicating with the lower side of said container and adapted to receive water therefrom, a pump for pumping said hydro-carbon liquid into said inlet passage, an ejector having a chamber therein, a primary passage leading into said chamber and a secondary passage leading from said chamber, a conduit connected to said secondary passage and connected to the inlet side of said pump, a float controlled conduit leading from above the bottom of said second container and communicating with said chamber of said ejector, a valve body secured to said ejector, a drain conduit leading from said second container to said valve body and means for controlling the flow of water through said valve body by the pressure in said chamber.

3. In a separator for separating water from a hydro-carbon liquid comprising a container having inlet and outlet passages, a body of fibrous absorbent material in said container, a drain valve structure having in combination, a second container communicating with the lower side of said container and adapted to receive water therefrom, a pump for pumping said hydro-carbon liquid into said inlet passage, an ejector having a chamber therein, a conduit connecting said chamber and the inlet of said pump, float-controlled means for varying the pressure in said chamber, a valve body secured to said ejector, a drain conduit for said second container connected to said valve body and a valve for preventing or permitting flow through said valve body controlled by pressure in said chamber.

4. In a separator for separating water from a hydro-carbon liquid having in combination, a container having inlet and outlet passages for the passage of said hydro-carbon liquid, a body of fibrous absorbent material in said container, a pump for pumping hydro-carbon liquid into said inlet passage, a drain valve structure comprising a second container communicating with the lower side of said first mentioned container and adapted to receive water therefrom, a conduit extending upwardly into said second container having openings at the upper end thereof, a float movable on said conduit by said water to close said openings, a casing comprising a pressure chamber and a valve body, said last mentioned conduit having communication with said pressure chamber, another conduit connected with said second container above the bottom thereof and communicating with said pressure chamber, a conduit communicating with said pressure chamber and the inlet side of said pump, a drain outlet secured to said valve body, a drain conduit for water leading from said container to said drain outlet, whereby said float controls the pressure in said pressure chamber, and means actuated by the pressure in said pressure chamber for controlling the discharge of said water through said drain outlet.

5. In a separator for separating water from a hydro-carbon liquid comprising a container having inlet and outlet passages for the continuous passage of said hydro-carbon liquid, a pump for pumping hydro-carbon liquid into said inlet passage, a drain valve structure having in combination, a second container communicating with the lower side of said first mentioned container and adapted to receive water therefrom, a conduit extending upwardly into said second container having openings in its upper end portion, said openings communicating with said second container, a float movable on said conduit by said water in said second container for closing said openings, a casing comprising a pressure chamber and a valve body, said conduit communicating with said pressure chamber, a primary passage into said pressure chamber and a secondary passage out from said pressure chamber, a conduit leading from an upper portion of said second container through said primary passage to said pressure chamber, a conduit leading from said secondary passage from said pressure chamber to said pump, an inlet and outlet passage in said valve body, a drain conduit leading from said second container to said inlet passage in said valve body, means for cutting off communication between said inlet and outlet passages in said valve body, and said means being actuated by pressure in said pressure chamber.

6. In a separator for separating water from a hydro-carbon liquid having in combination, a container having inlet and outlet passages for the continuous passage of said hydro-carbon liquid, a body of fibrous absorbent material in said container, a drain valve structure comprising a second container communicating with the lower side of said first mentioned container and adapted to receive water therefrom, a pump for pumping said hydro-carbon liquid into said inlet passage, a casing comprising a pressure chamber and a valve body, a primary inlet passage into said chamber and a secondary outlet passage from said chamber, a conduit connecting said secondary passage and said pump, a conduit extending upwardly into said second container having openings at its upper end portion, a float movable on said conduit in said container and adapted to close said openings, said conduit being connected with said pressure chamber, a drain conduit leading from said second container to said valve body, an outlet conduit leading from said valve body, means for cutting off communication between said conduits leading into and out from said valve body, a flexible member disposed in said valve body, said last mentioned means being connected to and movable with said flexible member, said flexible member and last mentioned means being actuated by said pressure in said pressure chamber.

ROBERT W. KENNEY.

References Cited in the file of this patent

UNITED STATES PATENTS

| Number | Name | Date |
|---|---|---|
| 2,412,841 | Spangler | Dec. 17, 1946 |
| 2,442,379 | Sameran | June 1, 1948 |
| 2,468,382 | Taylor | Apr. 26, 1949 |
| 2,525,154 | Taylor | Oct. 10, 1950 |
| 2,609,099 | Griswold | Sept. 2, 1952 |